United States Patent [19]
Kamio et al.

[11] Patent Number: 5,950,597
[45] Date of Patent: Sep. 14, 1999

[54] ELECTRONIC THROTTLE CONTROL HAVING THROTTLE SENSOR FAILURE DETECTING FUNCTION AND FAIL-SAFE FUNCTION

[75] Inventors: Shigeru Kamio, Nagoya; Shigeo Kikori, Toyota, both of Japan

[73] Assignees: Denso Corporation, Kariya; Toyota Jidosha Kabushiki Kaisha, Toyota, both of Japan

[21] Appl. No.: 09/026,179

[22] Filed: Feb. 19, 1998

[30] Foreign Application Priority Data

Feb. 20, 1997 [JP] Japan .................................. 9-036737

[51] Int. Cl.⁶ ...................................... F02D 7/00
[52] U.S. Cl. .................................... 123/397; 123/399
[58] Field of Search ...................... 123/396, 399, 123/397

[56] References Cited

U.S. PATENT DOCUMENTS

| | | | |
|---|---|---|---|
| 4,491,112 | 1/1985 | Kanegae et al. | 123/397 |
| 5,193,506 | 3/1993 | Ironside et al. | 123/399 |
| 5,235,951 | 8/1993 | Taguchi et al. | 123/399 |
| 5,339,782 | 8/1994 | Golzer et al. | 123/399 |
| 5,370,094 | 12/1994 | Sorg et al. | 123/399 |
| 5,429,092 | 7/1995 | Kamei | 123/399 |
| 5,553,581 | 9/1996 | Hirabayashi et al. | 123/399 |
| 5,602,732 | 2/1997 | Nichols et al. | 123/399 |

FOREIGN PATENT DOCUMENTS 4-350332  12/1992  Japan .

*Primary Examiner*—Erick R. Solís
*Attorney, Agent, or Firm*—Pillsbury Madison & Sutro LLP

[57] ABSTRACT

In an electronic throttle control for an engine, two throttle sensors are used to detect a throttle opening. When a sensor failure is detected in either of those throttle sensors, a feedback control is executed according to the output of the other normal sensor if any. If both throttle sensors fail or it cannot be determined whether there is any normal sensor, the feedback is stopped and the feedback variables are initialized and a motor control duty is set to –30% or 0% according to the existing accelerator depression. Thereafter, if the throttle sensors are not restored even after a preset determination delay time is over, an electromagnetic clutch and a DC motor are turned off to stop the electronic throttle control. A throttle valve is controlled mechanically for a limp-home running.

21 Claims, 11 Drawing Sheets

FIG. 1

FIG. 2A (CLUTCH: ON)

FIG. 2B (CLUTCH: OFF)

ELECTRONIC THROTTLE CONTROL HAVING THROTTLE SENSOR FAILURE DETECTING FUNCTION AND FAIL-SAFE FUNCTION

CROSS REFERENCE TO RELATED APPLICATION

This application relates to and incorporates herein by reference Japanese Patent Application No. 9-36737 filed on Feb. 20, 1997.

BACKGROUND OF THE INVENTION

1. Field of the Invention

The present invention relates to an electronic throttle control for an internal combustion engine, provided with a function for detecting failure of a throttle sensor used to detect the opening of a throttle valve (throttle opening).

2. Related Art

In an electronic throttle system mounted on a vehicle, how much the accelerator pedal is depressed (accelerator depression) is detected by an accelerator sensor and a target throttle opening is set according to the detected accelerator depression and a motor for driving the throttle valve is feedback-controlled (feedback control) so that the actual throttle opening detected by the throttle sensor matches with the target throttle opening.

In such an electronic throttle system, when a throttle sensor failure is detected, an electromagnetic clutch connecting the motor to the throttle valve is turned off to stop the throttle control for the purpose of fail-safe as disclosed in JP-A 4-350332. The vehicle begins limp-home running by interlocking the throttle opening mechanically with the accelerator pedal operation and displays a warning message indicating the failure.

The throttle sensor, even when it is normal, outputs signals on the same level as that of failure time signals due to signal noises, instantaneous break, etc. Since such a state is instantaneous, however, the normal state is restored immediately. In the above arrangement, if the throttle system detects even an instantaneous output change caused by noises, instantaneous break, etc. as a false failure the vehicle begins limp-home running immediately and displays the message indicating the failure. At this time, the output from the throttle sensor is already restored to its normal state. In such a case, the vehicle begins limp-home running and displays the warning even when the throttle sensor is normal, so that a driver would feel that the system is not reliable so much.

To prevent such a problem, a determination delay time is set longer than the signal width assumed for the noise, instantaneous break, etc. for determination of throttle sensor failure. When the failure output of the throttle sensor continues over the determination delay time, it is determined finally that a failure has occurred. Thus, false sensor failure detection caused by noise, instantaneous break, etc. can be prevented effectively.

The measure for preventing such detection failure, however, will continue the feedback control for the motor in response to the abnormal output from the throttle sensor until the preset determination delay time is over, even when the throttle sensor is in an abnormal state. As a result, the fail-safe operation is delayed, thus degrading the fail-safe operation of the system.

SUMMARY OF THE INVENTION

It is an object of the present invention to provide an electronic throttle control for an internal combustion engine, which can improve the reliability by providing a fail-safe operation and preventing a false detection of sensor failure.

According to an electronic throttle control of the present invention, a throttle control quantity is calculated so that an actual throttle opening matches with a target throttle opening set according to a detected accelerator depression, etc., so that this calculated throttle control quantity is used for a feedback-control of the throttle opening. At this time, when a failure in a throttle sensor (sensor failure) is detected, the control quantity is set to a specified value. While the sensor failure is outputted even after a preset determination delay time is over, the throttle control is stopped.

The specified value may be set preferably according to the accelerator depression. With this, a throttle valve can be controlled so as to be held or closed assuredly during the determination delay time after the sensor failure is detected by taking the operation characteristics of the throttle valve (opening characteristics of a spring force to be given to the throttle valve) into consideration. In addition, the fail-safe operation of the system can be improved more significantly.

Furthermore, when the control quantity is set to the specified value, the feedback control performed according to the output from the throttle sensor is preferably stopped and the feedback variable is initialized. In other words, when the sensor failure occurs temporarily due to signal noise, instantaneous break, etc., the feedback variable may also be changed to an abnormal value in some cases. Thus, the feedback variable is initialized to prevent the feedback control from being restarted with the abnormal feedback variable when the normal output from the throttle sensor is restored. With this, the normal feedback control can be restored rapidly.

Furthermore, in the event that the actual throttle opening is detected by using a plurality of throttle sensors to improve the fail-safe operation of the control system more, if a failure is detected in any of those sensors with the other throttle sensor being still operable, the feedback control is performed according to the output from the normal sensor. If there is no normal sensor or it is impossible to determine whether a normal sensor still exists, the control quantity is set to the specified value. If a sensor, after a sensor failure is detected, keeps the failure detection over the preset determination delay time, then the throttle control is stopped. Thus, the feedback control can be continued according to the output from the normal throttle sensor even during the determination delay time, so that the throttle controllability during the determination delay time can be improved significantly.

BRIEF DESCRIPTION OF THE DRAWINGS

Other objects, features and advantages of the present invention will be made more apparent by the following detailed description with reference to the accompanying drawings, in which.

DETAILED DESCRIPTION OF THE PREFERRED EMBODIMENT

Figure 1:
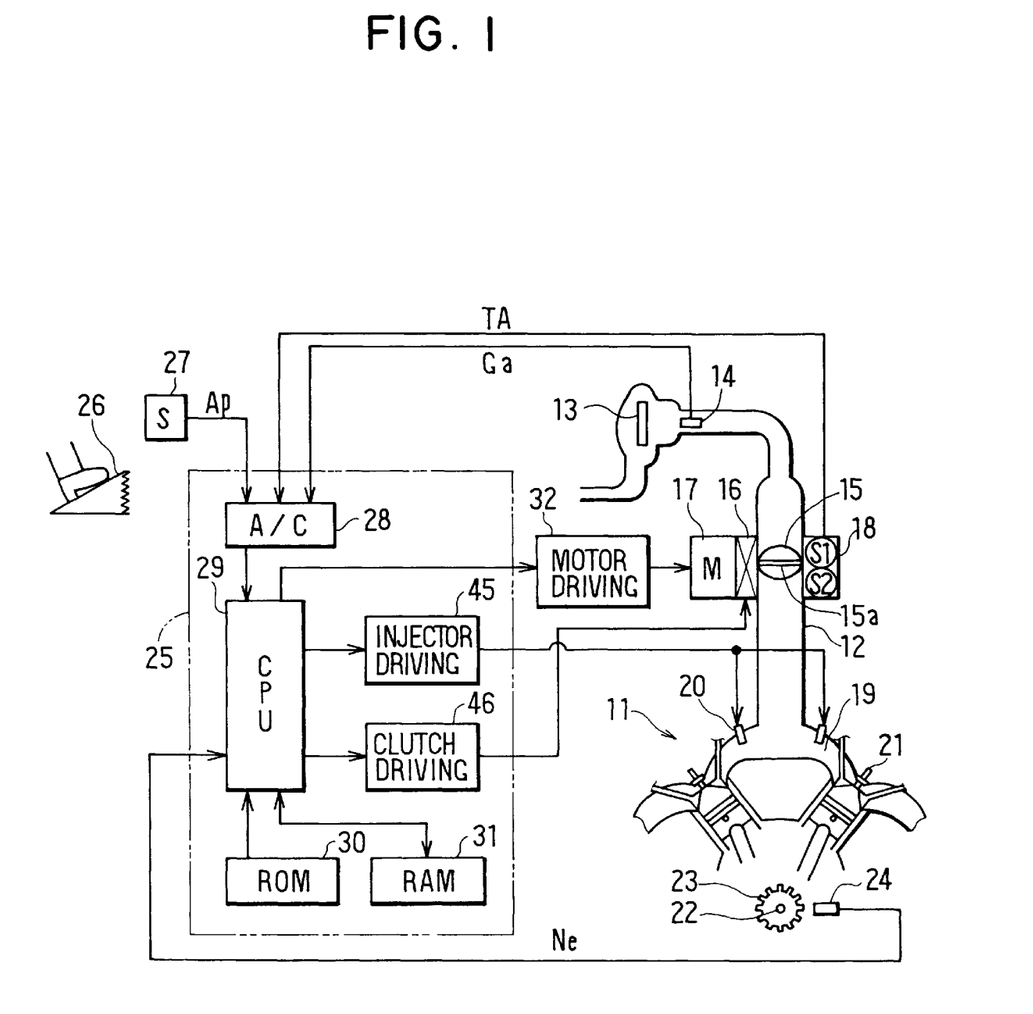
FIG. 1 is a schematic view of an electronic throttle control system according to an embodiment of the present invention.

In an engine system, more specifically an electronic throttle control system according to an embodiment shown in FIG. 1, an air cleaner 13 is provided in the upstream of an intake pipe 12 of an internal combustion engine 11. In the downstream of the intake pipe 12 is arranged an air flow meter 14 used to measure the intake air flow Ga. In the downstream of the meter 14 is provided a throttle valve 15. On a rotary shaft 15a of this throttle valve 15 is connected DC motor 17 for a throttle driving via an electromagnetic clutch 16. The degree of opening the throttle valve 15 (throttle opening) is controlled by the driving force of this DC motor 17. The throttle opening is detected by a throttle sensor unit 18. This throttle sensor unit 18 is a 2-track type sensor unit comprising the first and second throttle sensors S1 and S2. Each of the throttle sensors S1 and S2 comprises, for example, a contact type or non-contact type potentiometer using a Hall element.

An intake manifold 19 leading sucked air into each cylinder of the internal combustion engine 11 via the throttle valve 15 is provided with a fuel injector 20. The cylinder head of each cylinder of the internal combustion engine 11 is provided with an ignition plug 21. A crank angle sensor 24 is attached so as to face the outer periphery of a signal rotor 23 fit in the crankshaft 22 of the internal combustion engine 11. A pulse-like engine rotation speed signal Ne output from the crank angle sensor 24 is applied to an electronic control unit (ECU) 25 so that the rotation speed of the engine 11 is detected from the pulse interval of this signal Ne.

Operation quantity of an accelerator pedal 26 (accelerator depression) is detected by an accelerator sensor 27. A voltage signal Ap is output to a CPU 29 of the electronic control unit 25 via an A/D converter 28. The voltage signal of the sucked air Ga detected by the air flow meter 14, as well as the voltage signal of the throttle opening TA detected by the throttle sensor unit 18 are also applied to the CPU 29 via the A/D converter 28.

The electronic control unit 25 is a microcomputer comprising CPU 29, ROM 30, RAM 31, etc. The CPU 29 executes various engine control programs stored in the ROM 30, so that the control unit 25 controls the ignition timing of the ignition plug 21 as well as the injection pulses to be supplied to the injector 20 via an injector driving circuit 45. In addition, the CPU 29 executes various throttle control programs stored in the ROM 30 shown in FIG. 4, etc. to connect (turn on) the electromagnetic clutch 16 via an electromagnetic clutch driving circuit 46, so that the control unit 25 controls the DC motor 17 (PID control) via a motor driving circuit 32 (feed-back control) according to the accelerator depression Ap to control the throttle opening using the driving force of this DC motor 17.

Figure 2A:
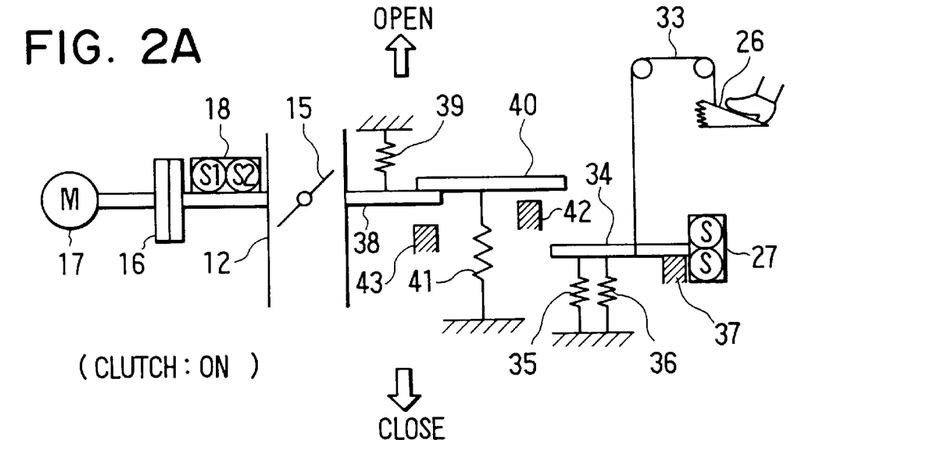
FIGS. 2A and 2B are block diagrams of the electronic throttle control system shown in FIG. 1 under a clutch ON state and a clutch OFF state, respectively.
Figure 2B:
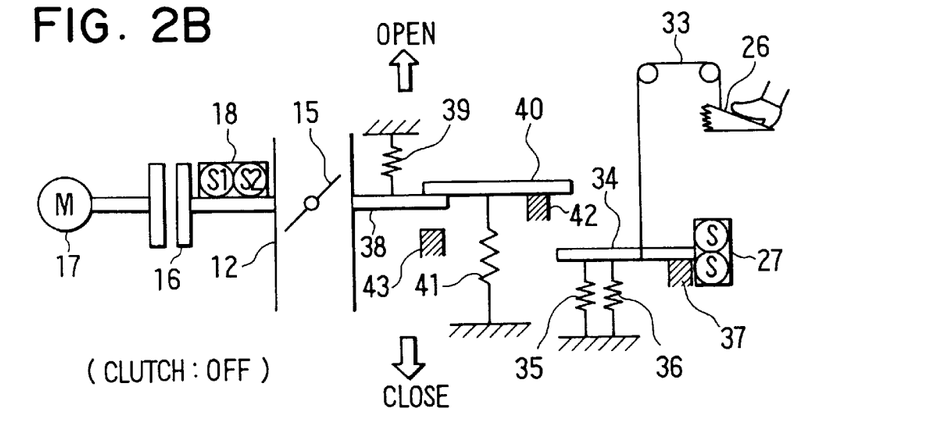
Figure 3:
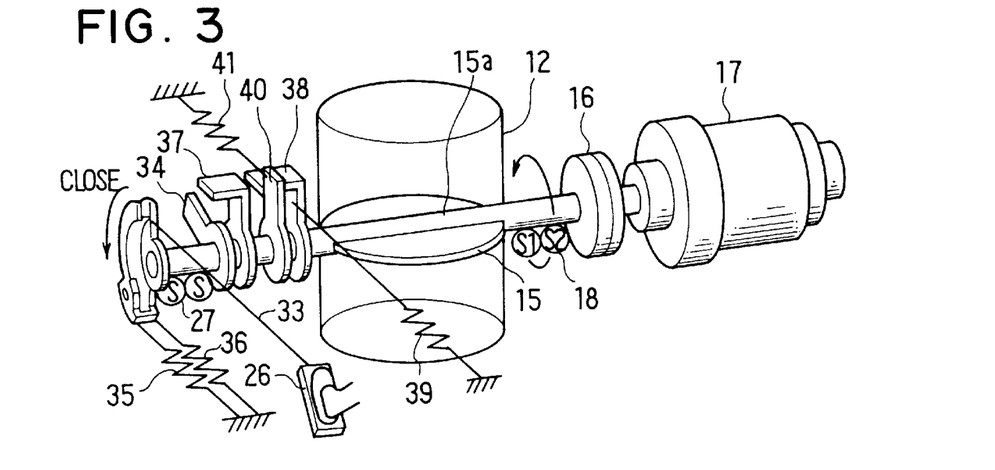
FIG. 3 is a perspective view showing partially the electronic throttle control system shown in FIG. 1.

As shown in FIGS. 2A, 2B and 3, the accelerator pedal 26 is connected to an accelerator lever 34 via a wire 33. This accelerator lever 34 is provided with a downward force as shown in FIG. 2 (in the direction to close the accelerator) by accelerator return springs 35 and 36. While the accelerator pedal 26 is idling (accelerator OFF or not depressed), the accelerator lever 34 is held in contact with an accelerator stopper 37 by the accelerator return springs 35 and 36. While the engine 11 is operating, the position of the accelerator lever 34 is detected by the accelerator sensor 27 as the accelerator depression Ap.

A throttle lever 38 is linked to the rotary shaft 15a of the throttle valve 15. This lever 38 is pushed up in the direction to open the throttle valve 15 by a spring 39 used for a limp-home running of a vehicle. An opener 40 is provided so as to be fit at the opening side of the lever 38. This opener 40 is pushed down in the direction to close the throttle valve 15 by a return spring 41. The pulling force of this return spring 41 is set larger than the pulling force of the spring 39.

When in a normal control, the electromagnetic clutch 16 is kept connected (clutch ON) as shown in FIG. 2A. In this state, the DC motor 17 is rotated forward or backward according to the operation of the accelerator pedal 26 to adjust the degree of opening of the throttle valve 15 (throttle opening). The throttle opening is then detected by the throttle sensor unit 18. At this time, when increasing the throttle opening, the DC motor 17 is rotated forward to drive the throttle valve 15 and open the throttle while the lever 38 pushes up the opener 40 against the pulling force of the return spring 41. On the contrary, when decreasing the throttle opening, the DC motor 17 is rotated backward to drive the throttle valve 15 to close the throttle while the lever 38 pushes down the opener 40. When the throttle valve 15 is closed up to the full-close stopper position (throttle opening=0 degree), the throttle lever 38 impacts the throttle full-close stopper 43 and is prevented from further rotation.

On the other hand, when a throttle failure is detected and the vehicle is to limp home, the electromagnetic clutch 16 is kept disconnected (clutch OFF) as shown in FIG. 2B. If the driver depresses the accelerator pedal 26 over a specified value in this state, the accelerator lever 34 comes in contact with the opener 40. Hereafter, the opener 40 is pushed up and opened by the accelerator lever 34 according to the depression of the accelerator pedal 26. The throttle lever 38 is pushed up by the limp-home running spring 39 in the direction of opening, so that the throttle opening is adjusted mechanically in accordance with the depression of accelerator pedal 26.

When the accelerator pedal 26 is depressed below a specified value during this limp-home running (clutch OFF), the accelerator lever 34 is released from the opener 40, then the pulling force of the valve return spring 41 becomes larger than that of the limp-home running spring 39. Thus, the opener 40 is held in contact with the opener stopper 42. In this state, the throttle lever 38 (throttle opening) is held by the opener 40 at the position of an opening (about 34 degree) limited by an opener stopper 42 (opener stopper opening). Thus, the idling rotation for limp-home running is assured.

The normal time idling rotation is controlled by the throttle opening under the opener stopper opening value. When the accelerator pedal 26 is depressed in this idling state and the target throttle opening exceeds the opener stopper opening, the feedback control drives the throttle valve 15 to open. When the opener stopper opening is exceeded, the throttle lever 38 is opened by the pulling force of the limp-home running spring 39 until the throttle lever 38 comes into contact with the opener 40. Thereafter, the throttle lever 38 is closed by the pulling force of the return spring 41. As a result, the force to apply to the throttle lever 38 is reversed at the opener stopper opening, so that the DC motor 17 loading direction is reversed.

Figure 4:
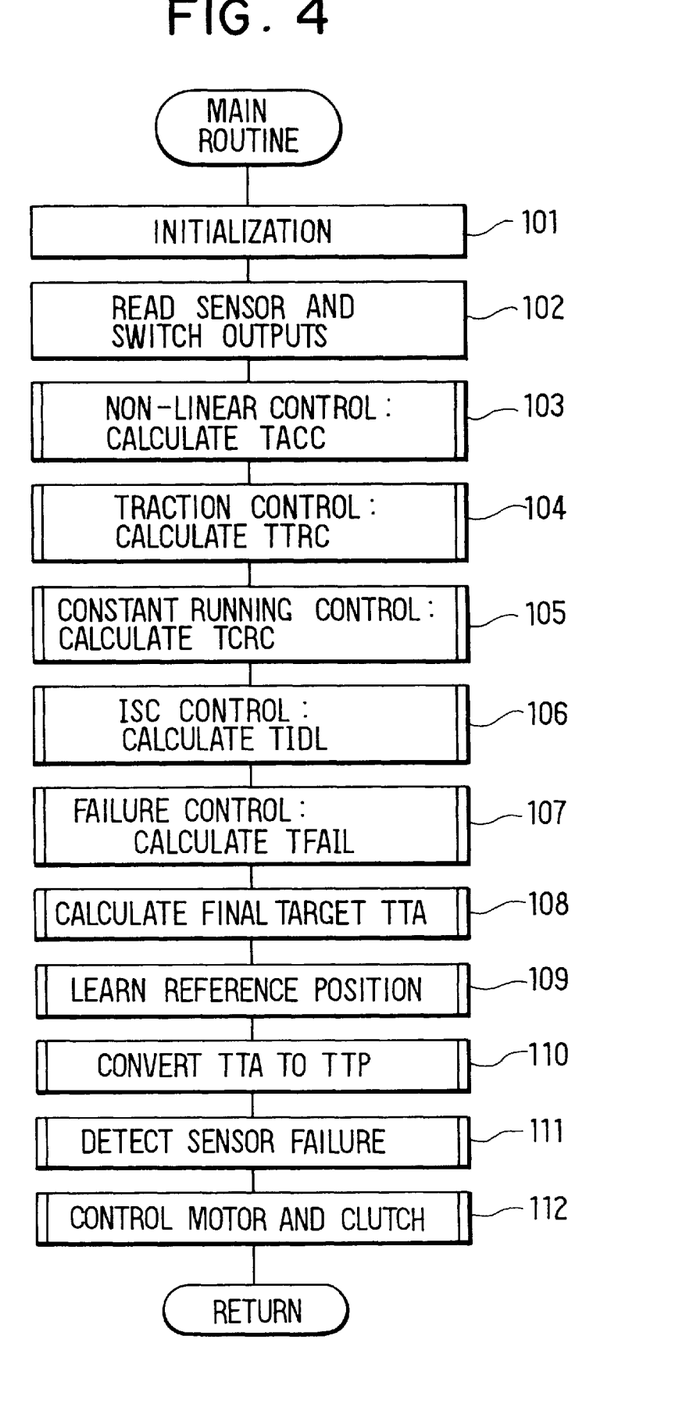
FIG. 4 is a flow chart showing a main routine executed in the electronic throttle control.
Figure 5:
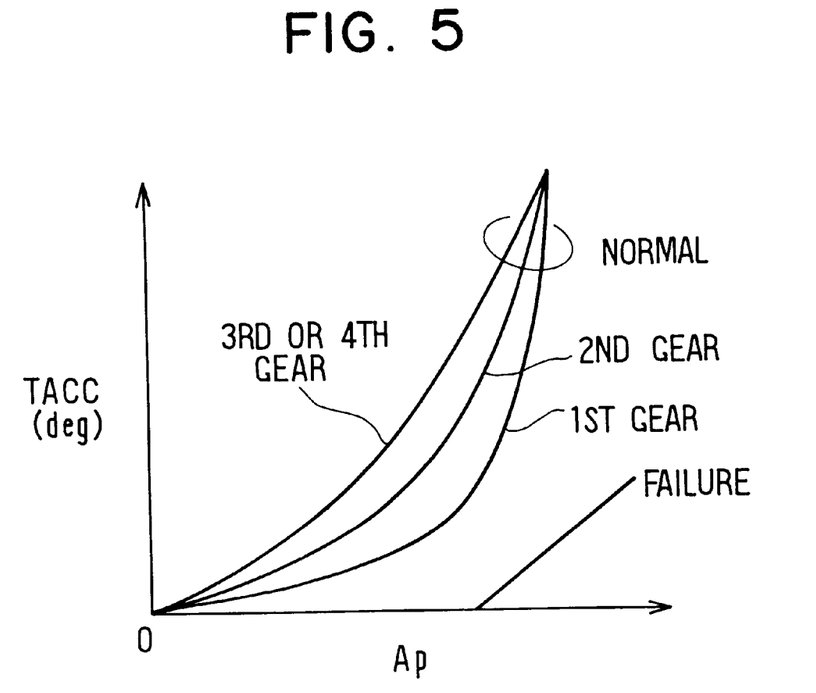
FIG. 5 is a graph showing a relation between a non-linear target opening TACC and an accelerator depression Ap.

In order to perform the above throttle control, a control routine shown in FIG. 4 is repeated by the electronic control unit 25, for example, at cycles of 2 ms after the ignition switch (not illustrated) is turned on. When this main routine is started, an initialization is made in step 101. This initialization includes a check of each unit of the electric system for communication failure, a mirror check, etc. for the initial value of the RAM 31. Thereafter, signals from sensors and switches are read in step 102, then a non-linear control routine is executed in step 103 to compute the target throttle opening (non-linear target opening) TACC of the throttle valve 15 from the accelerator operation value Ap non-linearly using a map shown in FIG. 5.

Thereafter, a traction control routine is executed in step 104 to compute a target throttle opening (target traction opening) TTRC of the throttle valve 15 according to the traction control quantity of the vehicle. Then, a constant running control routine is executed in step 105 to compute the initial opening of the throttle valve 15 for changing the mode to the constant running control one, as well as the target opening (target constant running opening) TCRC of the throttle valve 15 to match the actual speed of the vehicle detected by a vehicle speed sensor (not illustrated) with the target vehicle speed.

Then, an idle rotation control (ISC control) routine is executed in step 106 to compute the target opening (target ISC opening) TIDL of the throttle valve 15 for idling. Thereafter, a failure control routine is executed in step 107 to compute the opening of the throttle valve 15 for limp-home running by controlling the DC motor 17 when in, for example, a sticking of the electromagnetic clutch 16, a break of the return spring 41, etc., which means the target opening (target failure opening) of the throttle valve 15 when in a failure.

Figure 6:
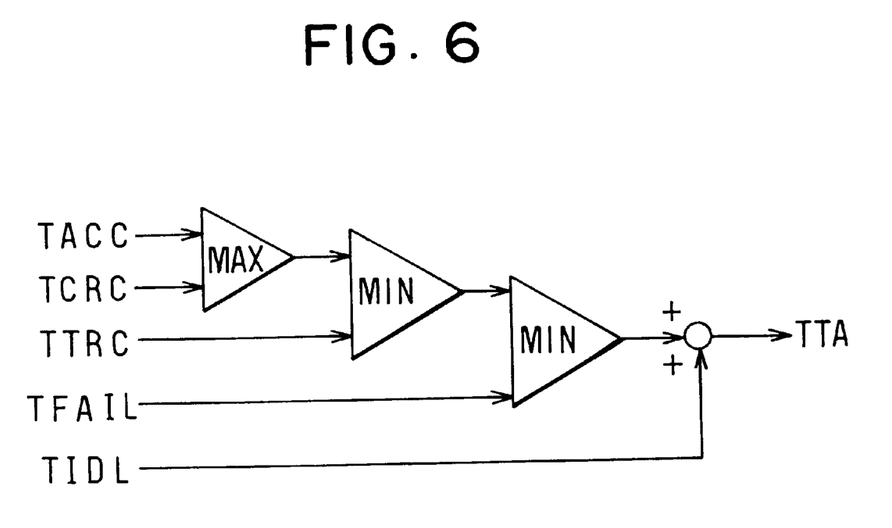
FIG. 6 is a diagram showing a procedure for setting a final target opening TTA from a non-linear target opening TACC, a constant running target opening TCRC, a traction target opening TTRC, a fail target opening TFAIL, and an ISC target opening TCRC.

Thereafter, the final target throttle opening (final target opening) TTA is computed in step 108 according to each target opening in relation to the non-linear control, traction control, constant running control, ISC control, and fail control computed in steps 103 to 107 above. In this computing method, as shown in FIG. 6, the non-linear target opening TACC is compared with the target constant running opening TCRC to select the larger value, then this selected value is compared with the target traction opening TTRC to select the smaller value. Furthermore, this selected value is compared with the target failure opening TFAIL to select the smaller value. Finally, the target ISC opening TIDL is added to this selected value to compute the final target opening TTA.

Thereafter, a reference position learning routine is executed in step 109 shown in FIG. 4 to learn the reference position according to the output voltage OTP from the throttle sensor unit 18 at the reference position (full-closure stopper position).

Figure 7:
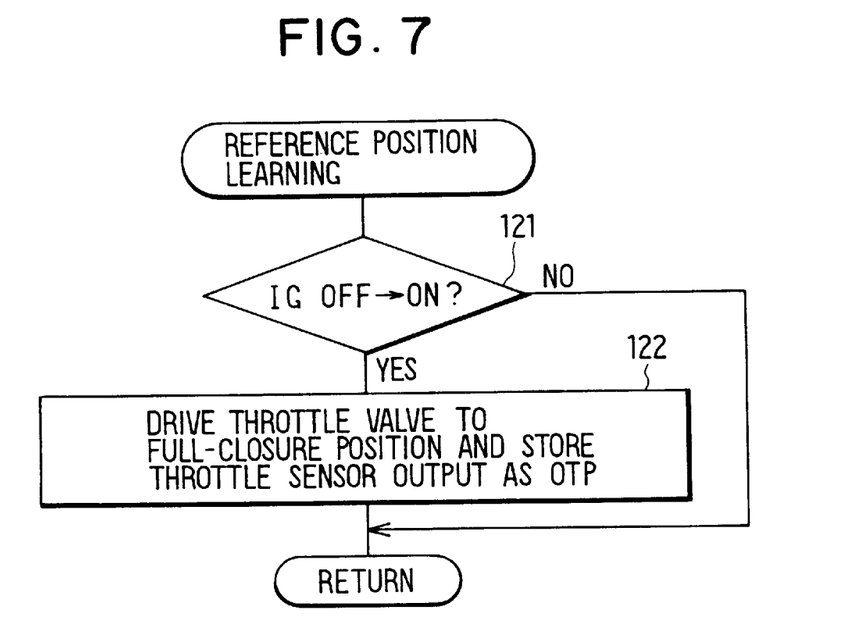
FIG. 7 is a flow chart showing a reference position learning routine executed in the electronic throttle control.
Figure 8:
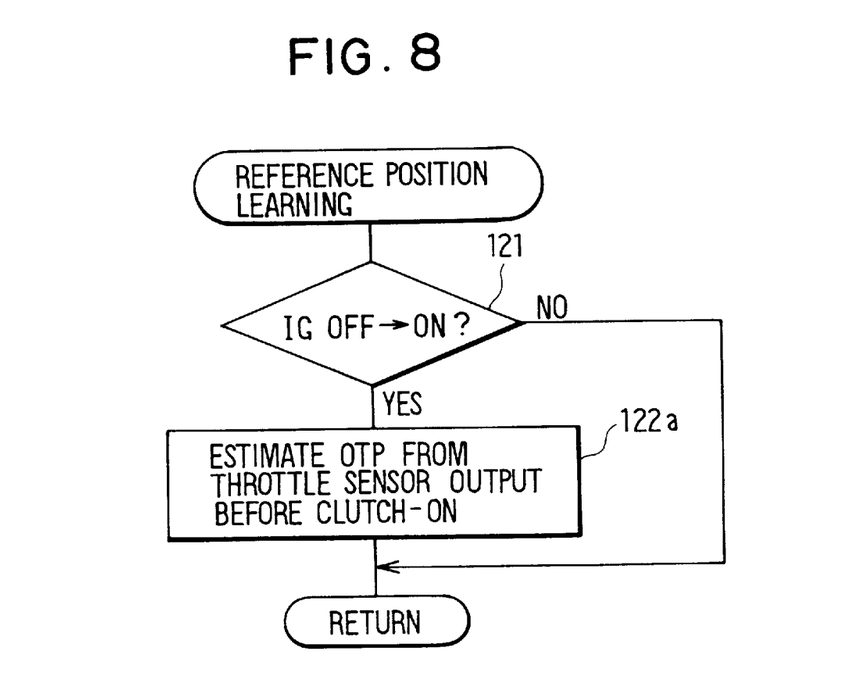
FIG. 8 is a flow chart showing another reference position learning routine executed in the electronic throttle control.

There are two types of the reference position learning method as shown in FIG. 7 and FIG. 8.

The reference position learning routine shown in FIG. 7 is repeated, for example, at every 8 ms so that just after the ignition switch (IG) is turned on, control starts from step 121 to 122. As a result, the throttle valve 15 is driven until it comes in contact with the full-closure stopper 43 and the output voltage OTP of the throttle sensor unit 18 at the full-closure stopper position is read to learn the reference position directly.

Instead of the reference position learning routine shown in FIG. 7, the reference position learning routine shown in FIG. 8 may be executed. The reference position learning routine shown in FIG. 8 executes the processing in step 122a instead of the processing in step 122 shown in FIG. 7. In other words, just after the ignition switch (IG) is turned on, control moves from step 121 to 122a, where the output from the throttle sensor unit 18 is read before the electromagnetic switch 16 is turned on to estimate the output voltage OTP of the throttle sensor unit 18 at the full-closure stopper position from this output value. In other words, before the electromagnetic clutch 16 is turned on (OFF state), the throttle lever 38 comes in contact with the opener 40 as shown in FIG. 2B and the opener 40 is held in contact with the opener stopper 42 (opener stopper opening). Thus, before the electromagnetic clutch 16 is turned on, the opening of the throttle valve 15 is held at the opener stopper opening (about 3 to 4 degrees). The output voltage OTP of the throttle sensor unit 18 at the full-closure stopper position can thus be estimated from the output voltage of the throttle sensor unit 18 at this opener stopper opening.

Figure 9:
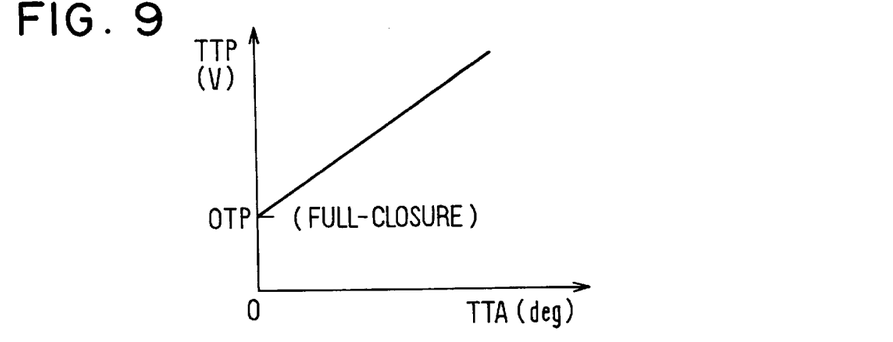
FIG. 9 is a graph showing a relation between the final target opening TTA and a target voltage TTP.

After the reference position learning routine shown in FIG. 7 or FIG. 8 is executed, control returns to step 110 in FIG. 4. In step 110, the final target opening TTA obtained in step 108 is converted to the target voltage TTP using the opening-voltage conversion map shown in FIG. 9.

Figure 11:
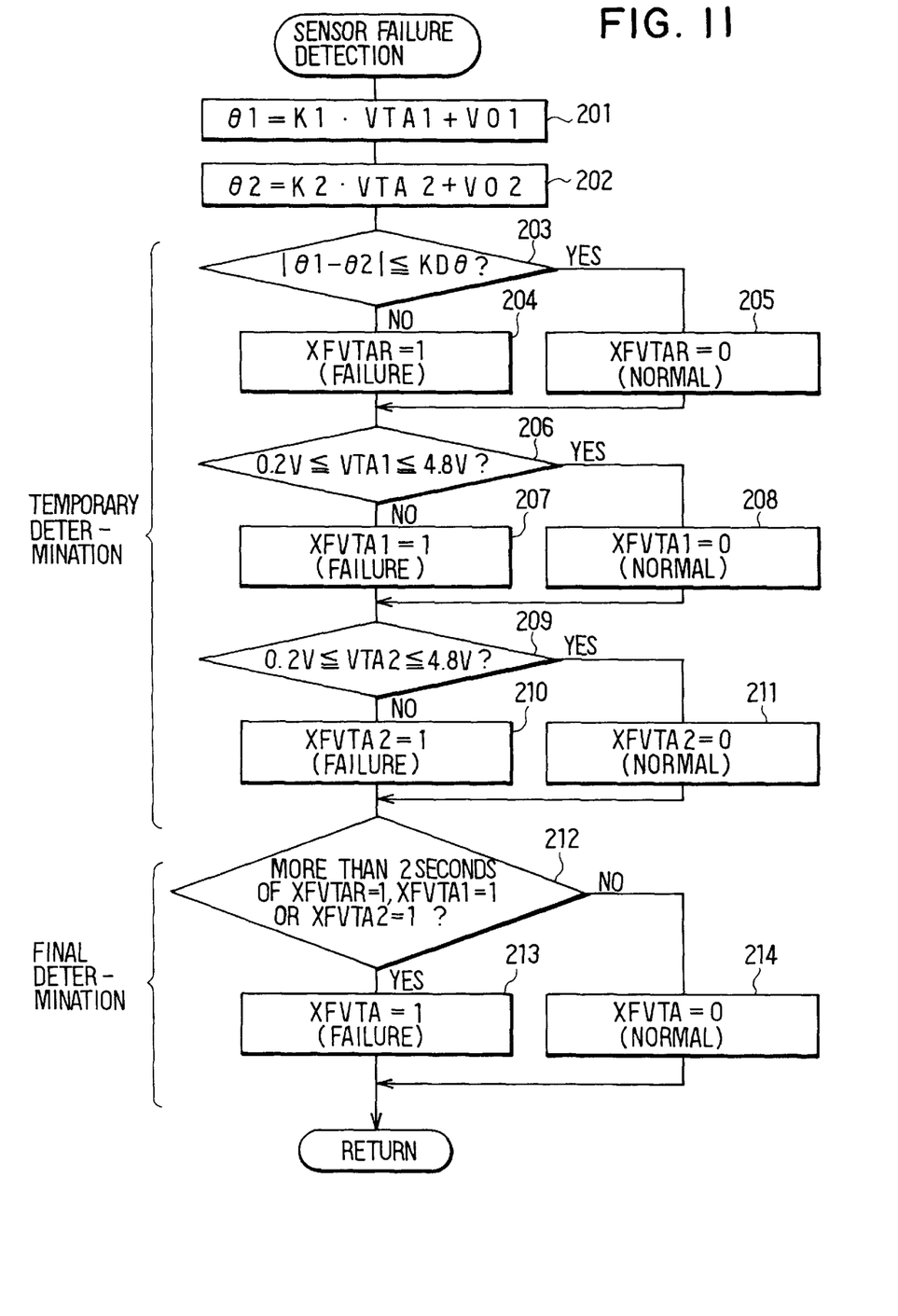
FIG. 11 is a flow chart showing a sensor failure detecting routine executed in the electronic throttle control.
Figure 13:
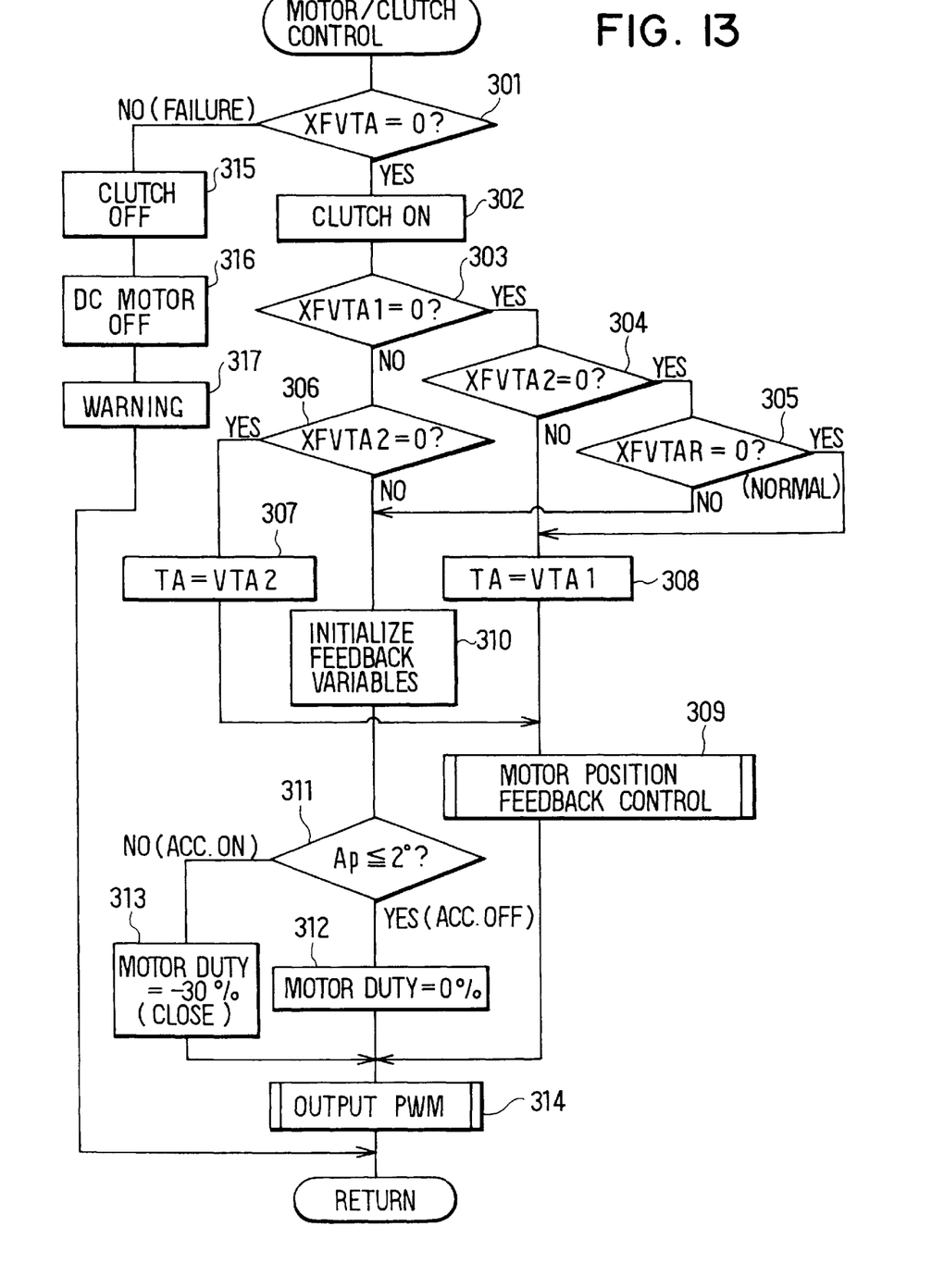
FIG. 13 is a flow chart showing a motor/clutch control routine executed in the electronic throttle control.

Thereafter, the sensor failure detecting routine shown in FIG. 11 is executed in step 111 to determine whether or not a failure is detected by the throttle sensor unit 18. Then, the motor/clutch control routine shown in FIG. 13 is executed in step 112.

The sensor failure detecting routine shown in FIG. 11 is repeated, for example, at every 8 ms after the ignition switch (not illustrated) is turned on. The routine detects failure of the throttle sensor unit 18 (sensor failure). In this embodiment, the throttle sensor unit 18 is a 2-track type sensor unit comprising the first and second sensors S1 and S2. The voltage signals VTA1 and VTA2 output from the throttle sensors S1 and S2 are changed linearly according to the throttle opening $\theta1$ and $\theta2$. In the normal state, they are set so that the deviation of each of the two output voltage signals VTA1 and VTA2 becomes within a specified range.

When the sensor failure detecting routine is started, the detected throttle opening $\theta1$ is computed from the voltage VTA1 output from the first throttle sensor S1 in step 201.

$$\theta1 = K1 \cdot VTA1 + V01$$

Figure 12:
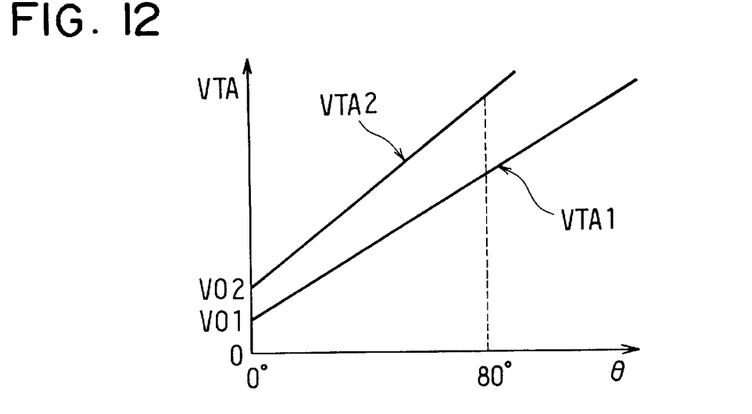
FIG. 12 is a graph showing output characteristics of two throttle sensors.

In the above expression, K1 is a constant used to convert the output voltage VTA1 to a throttle opening value and V01 is an offset which is the output voltage VTA1 when the throttle opening is 0° as shown in FIG. 12.

Thereafter, the detected throttle opening θ2 is computed from the voltage VTA2 output from the second throttle sensor S2 in step 202.

$$\theta2 = K2 \cdot VTA2 + V02$$

In the above expression, K2 is a constant used to convert the output voltage VTA2 to a throttle opening value and V02 is an offset which is the output voltage VTA2 when the throttle opening is 0° as shown in FIG. 12.

Thereafter, the absolute value of the deviation of each detected throttle opening θ1 and θ2 is compared with a preset specified failure criterion KDθ in step 203. If the result is |θ1−θ2|≦KDθ, the sensor is determined to be normal. Then, control goes to step 205, where the first temporary failure flag XFVTAR is set to "0" that means "normal". When the result is |θ1−θ2|>KDθ, a failure other than short/wire break, for example, a half-short/half open caused by imperfect connection, is detected in the sensor. Thus, the first temporary failure flag XFVTAR is set to "1" that means "failure (abnormal)".

After the first temporary failure flag XFVTAR is set, control proceeds to step 206, where it is determined whether or not a failure (short-circuit/wire break, etc.) is detected in the first throttle sensor S1 according to whether or not the output voltage VTA1 of the first throttle sensor S1 is within the normal voltage range (0.2V≦VTA1≦4.8V). In other words, when in 0.2V≦VTA1≦4.8V, the sensor is determined to be normal and control proceeds to step 208, where the second temporary failure flag VFVTA1 is set to "0" that means "normal". When in VTA1<0.2V or VTA1>4.8V, the first throttle sensor S1 is determined to be abnormal (short-circuit/wire break) and control proceeds to step 207, where the second temporary failure flag VFVTA1 is set to "1" that means "failure".

After the second temporary failure flag XFVTA1 is set, control proceeds to step 209, where it is determined whether or not a failure (short-circuit/wire break, etc.) is detected in the second throttle sensor S2 according to whether or not the output voltage VTA2 of the second throttle sensor S2 is within the normal voltage range (0.2V≦VTA2≦4.8V). In other words, when in 0.2V≦VTA2≦4.8V, the sensor is determined to be normal and control proceeds to step 211, where the third temporary failure flag VFVTA2 is set to "0" that means "normal". When in VTA2<0.2V or VTA2>4.8V, the second throttle sensor S2 is determined to be abnormal (short-circuit/wire break) and control proceeds to step 210, where the third temporary failure flag VFVTA2 is set to "1" that means "failure".

After the three types of temporary failure determinations ends, control proceeds to step 212. In step 212, it is determined whether or not at least one of the above three flags XFVTAR, XFVTA1, and XFVTA2 is set to "1" that means "failure" and the state is continued for a preset determination delay time (e.g., 2 seconds) to prevent false detection of sensor failure caused by signal noise, instantaneous break, etc. If any flag is kept set to "1" for the preset time, the state is determined finally as abnormal and control proceeds to step 213. In step 213, the flag XFVTA is set to "1" that means a real failure.

On the contrary, when all the temporary failure flags XFVTAR, XFVTA1, and XFVTA2 are set to "0" that mean "normal", the sensor is determined to be normal. If, even when any of those flags is set to "1", the state is not kept for the preset determination delay time (that is, restored to the normal state within a preset determination delay time), then the state is determined finally to be normal. Then, control proceeds to step 214, where the real or final failure flag XFVTA is set to "0" that means "normal".

The above determination delay time is not limited only to 2 seconds. Any length of the time is permissible if it is longer than a signal width of noise, instantaneous break, etc. In addition, the determination delay time may be changed according to the failure mode, operation state, etc.

The motor/clutch control routine shown in FIG. 13 is repeated, for example, at every 8 ms after the ignition switch (not illustrated) is turned on, so that the DC motor 17 and the electromagnetic clutch 16 are controlled as follows. At first, it is determined whether or not the real or final failure flag XFVTA is set to "0" that means "normal" in step 301. When in XFVTA=0 (normal), control proceeds to step 302, where the electromagnetic clutch 16 is kept on (that is, the DC motor 17 is linked to the throttle valve 15).

Figure 10:
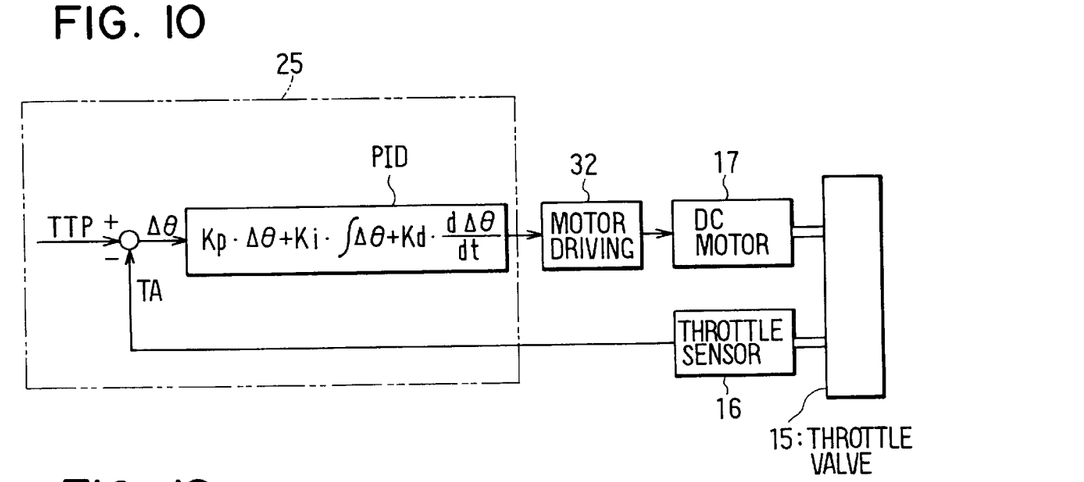
FIG. 10 is a block diagram of a PID control for the throttle opening.

Thereafter, when it is determined that all of the 3 temporary failure flags XFVTA1, XFVTA2, and XFVTAR are set to "0" (normal) in steps 303 to 305 (that is, when both throttle sensors S1 and S2 are normal), control proceeds to step 308. In step 308, the output voltage VTA1 of the first throttle sensor S1 is used as the output voltage TA of the throttle sensor unit 18. Then, in the next step 309, according to this output voltage TA (=VTA1), the position of the DC motor 17 (that is, the throttle opening) is controlled (feedback-control) as follows. The target voltage TTP is compared with the output voltage TA of the throttle sensor unit 18 as shown in FIG. 10. To reduce the deviation Δθ (=TTP−TA), processing of proportion (P), integration (I), and differentiation (D) are executed to compute the control quantity of the DC motor 17. The following transmission function is used to execute these PID calculations.

$$\text{Control quantity} = Kp \cdot \Delta\theta + Ki \cdot \int \Delta\theta + Kd \cdot (d\Delta\theta/dt)$$

Then, the above control quantity is converted to a duty specific signal Duty in the next step 314. This duty specific signal Duty is applied to the DC motor 17 via a motor driving circuit 32 (as a PWM output processing). With this, the throttle valve 15 is feedback controlled so that the actual throttle opening matches with the final target opening TTA instructed by the above target voltage TTP.

On the other hand, when the temporary failure flag XFVTA1 is determined to be set to "1" (short-circuit/wire break in the first throttle sensor S1) in step 303, control proceeds to step 306. In step 306, it is determined whether or not the flag XFVTA2 is set to "0" (second throttle sensor S2 is normal). If the value is "0", control proceeds to step 307, where the output voltage VTA2 of the second throttle sensor S2 is adopted as the output voltage TA of the throttle sensor unit 18. Then, control proceeds to step 309, where the position of the DC motor 17 (that is, the throttle opening) is controlled (feedback control) according to this output voltage TA (=VTA2). In other words, if, even when the first throttle sensor S1 is abnormal, the second throttle sensor S2 is normal, then the position of the DC motor 17 is feedback controlled according to the output voltage VTA2 of the second throttle sensor S2.

When the flag XFVTA1 is set to "0" (the first throttle sensor S1 is normal) and the flag XFVTA2 is set to "1" (the second throttle sensor S2 is abnormal (short-circuit/wire break) in steps 303 and 304, control proceeds to steps 308 and 309 just like when both throttle sensors S1 and S2 are normal (all the flags XFVTA1, XFVTA2, and XFVTAR are "0"). Then, the position of the DC motor 17 is feedback controlled according to the output voltage VTA1 of the first throttle sensor S1 in those steps.

When the flags XFVTA1 and XFVTA2 are set to "1" in steps 303 and 306 (both throttle sensors S1 and S2 are abnormal (short-circuit/wire break), control proceeds to step 310, where the feedback control is stopped and the feedback variable Kp, Ki and Kd (the previous value in each item used to compute the PID value in the feedback control) is initialized. When a temporary sensor failure occurs due to a noise, wire break, etc., the feedback variable may also be changed to an abnormal value in some cases. Thus, the feedback variable is initialized to prevent the feedback control from being restarted with an abnormal feedback variable when the normal output of the throttle sensor unit 18 is restored. The normal feedback control state can thus be restored rapidly.

When the flag XFVTAR is set to "1" (failure) in step 305, control also proceeds to step 310, where the feedback control is stopped and the feedback variable is initialized. This is because it is impossible to determine which of the throttle sensors S1 and S2 is abnormal in the case of a half-short-circuit/half-open.

Control proceeds to step 311 after the feedback variable initialization. Then, it is determined whether or not the accelerator depression Ap is 2 degrees or below (that is, accelerator OFF) in the step. If determined to be 2 degrees or below, control proceeds to step 312, where the duty specific signal Duty (Motor Duty) to be applied to the DC motor 17 is set to 0% and the PWM value is output in step 314. With this, the DC motor 17 is stopped and the opening of the throttle valve 15 is kept at idle. The normal motor rotation in the idle state is controlled at an opening (opener stopper opening) limited by the opener stopper 42 or below. So, the throttle valve 15 is pulled by the pulling force of the limp-home running spring 39 in the opening direction. When the electromagnetic clutch 16 is on, however, the operation of the throttle valve 15 is held by the DC motor 17 that is stopped, so that the throttle valve 15 cannot be opened up to the opening of the opener stopper. The rotation speed of the engine is thus suppressed from increasing and the idling is assured.

On the contrary, when the accelerator depression Ap is determined to be greater than 2 degrees (that is, accelerator ON) in step 311, the throttle valve 15 is already opened. Thus, control proceeds to step 313, where the throttle valve 15 is set to the minimum motor duty (eg., −30%) for closing the throttle valve 15 and the PWM value is output in step 314 to close the throttle valve 15 gradually. The processings in steps 303 to 313 function to respond a temporary failure.

The above processings executed at a normal time and at a failure time within the determination delay time respectively are summarized as follows.

(1) When the first throttle sensor S1 is normal:

The output voltage VTA1 of the first throttle sensor S1 is adopted for feedback control whether the second throttle sensor S2 is normal or abnormal.

(2) When the first throttle sensor S1 is abnormal:

As long as the second throttle sensor S2 is normal, the output voltage VTA2 of the second throttle sensor S2 is adopted for the feedback control. If the second throttle sensor S2 is also abnormal, the feedback control is stopped and the feedback variable is initialized. In addition, the motor duty is set to −30% or 0% according to the accelerator state (ON/OFF). The motor duty may also be set in 3 steps or more according to the accelerator opening.

When the temporary failure state (at least one of the 3 flags XFVTAR, XFVTA1, and XFVTA2 is set to "1" (failure)) is kept for the preset determination delay time, the throttle is determined to be abnormal in the processings in step 212 and 213 shown in FIG. 11. Thus, the real failure flag XFVTA is set to "1" (real failure). Thereafter, it is determined "NO" in step 301 shown in FIG. 13 and control proceeds to step 315. In step 315, the electromagnetic clutch 16 is turned off. In step 316, the DC motor 17 is turned off to stop the throttle control, so the vehicle begins limp-home running. Then, the warning lamp (not illustrated) is turned on and a warning sound is output to notify the driver of the abnormal state in step 317. The processings in steps 315 and 316 function to stop electronic throttle.

Figure 14:
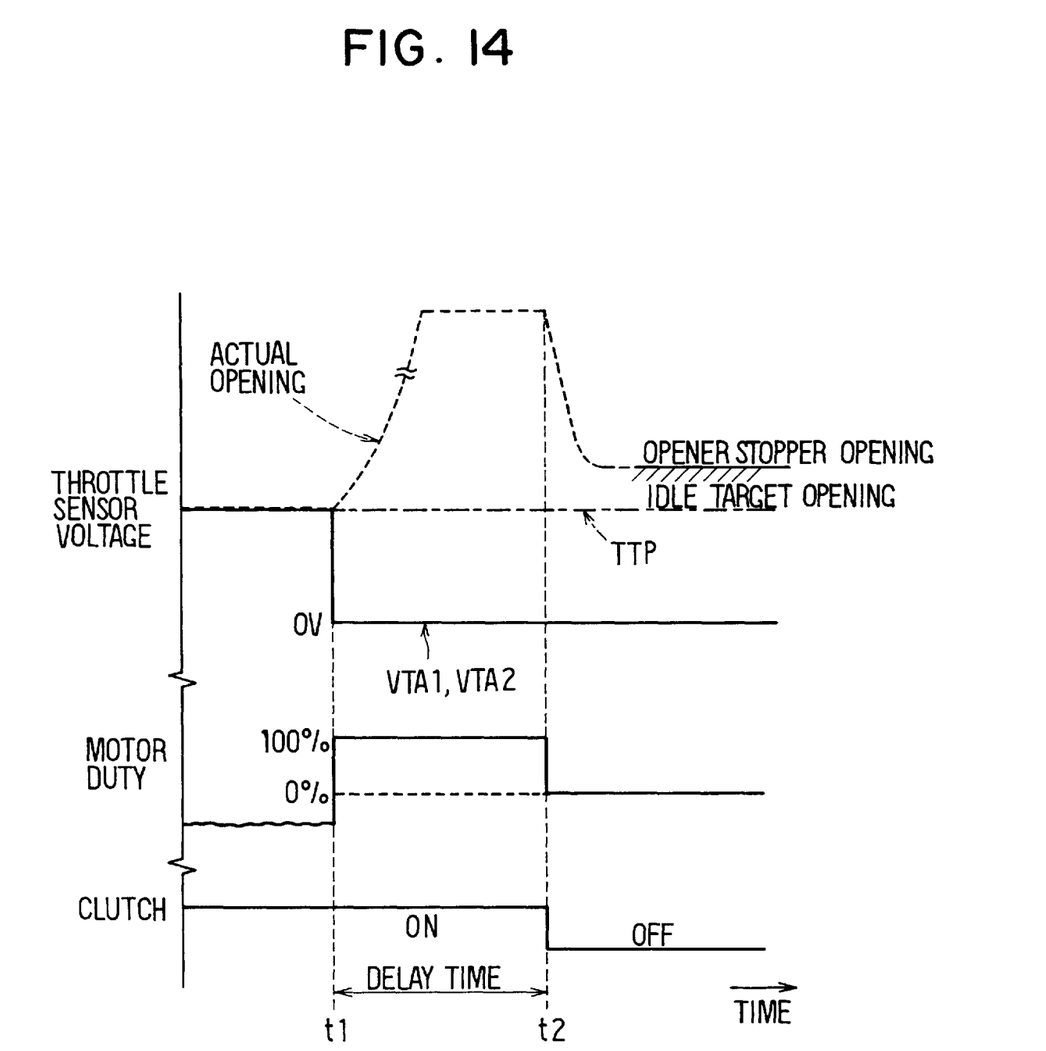
FIG. 14 is a time chart showing operation of the electronic throttle control after a temporary failure is detected while an accelerator is not depressed in a comparative example.

In a case that a signal wire break occurs, as shown in FIG. 14, at time t1 in both throttle sensors S1 and S2 under the condition that the accelerator is off, the output voltages VTA1 and VTA2 from those sensors become 0V and a temporary failure is detected at time t1. When this failure state is continued for a preset determination delay time (t1–t2), the failure is determined as the real failure at time t2 and the electromagnetic clutch is turned off. This operation is the same as that in the above embodiment. In this case, however, during the determination delay time between when the temporary failure is detected and when the real failure is detected, the feedback control is continued according to the output voltage from the throttle sensor. In addition, since the PID operation is continued to reduce the deviation between the output voltage from the throttle sensor and the target voltage TTP (target throttle opening), the motor duty is set to the maximum value (100%) during the determination delay time even when the accelerator is turned off. Consequently, the actual throttle opening is driven far over the target throttle opening (target voltage TTP), resulting in an excessive rise of the engine rotation speed.

Figure 15:
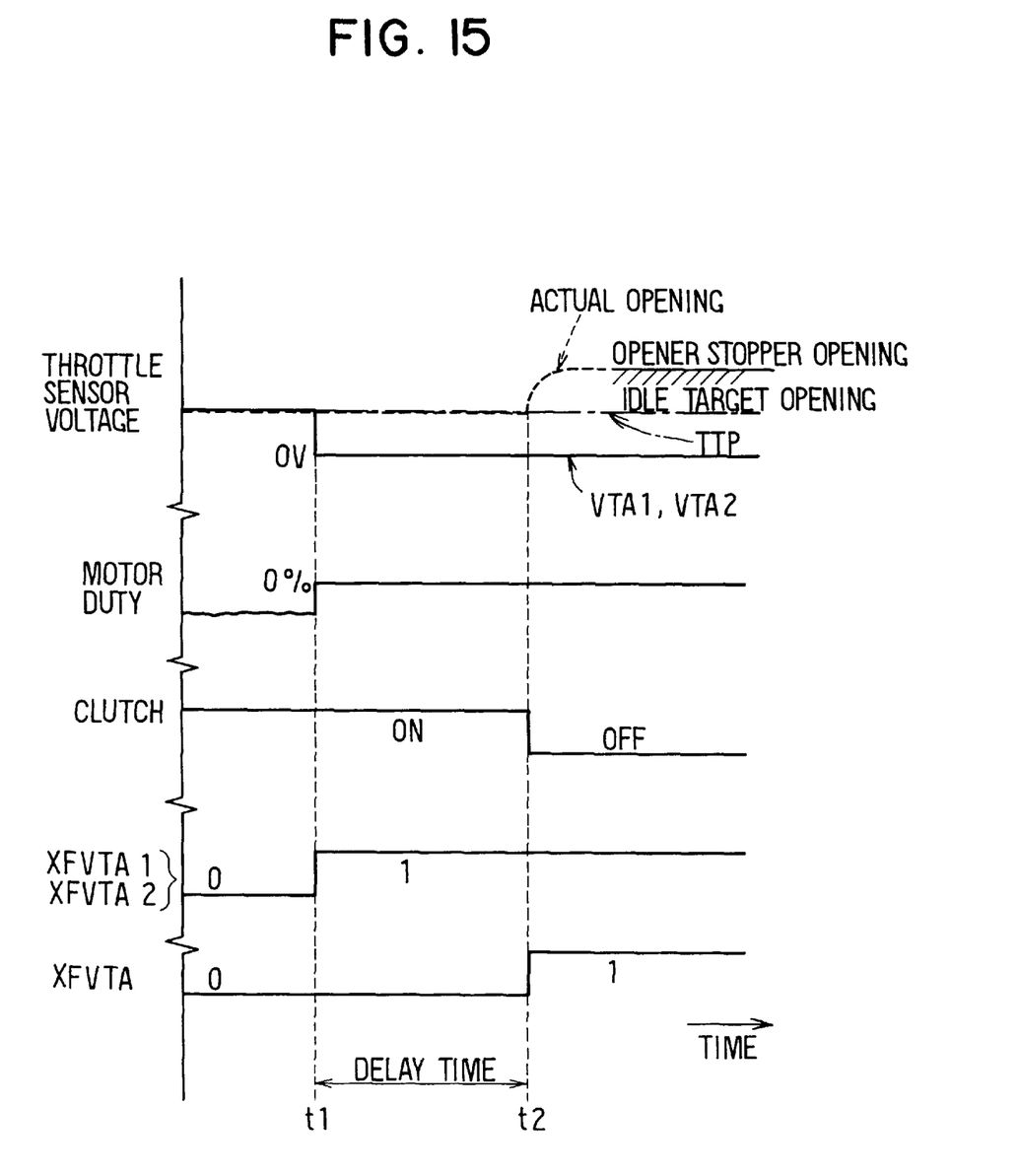
FIG. 15 is a time chart showing operation of the electronic throttle control after a temporary failure is detected when the accelerator is not depressed in the electronic throttle control system shown in FIG. 1.

In this embodiment, however, when the output voltages VTA1 and VTA2 of the throttle sensors S1 and S2 become 0V due to a signal wire break when the accelerator is off as shown in FIG. 15 and a temporary failure is detected at time t1, the motor duty is fixed to 0% (in steps 311 and 312 in FIG. 13) and the DC motor 17 is stopped. Since the target throttle opening, when the accelerator is off (that is, the target opening), is under the opener stopper opening, the throttle valve 15 is opened by the pulling force of the limp-home running spring 39. During the determination delay time (t1–t2), the electromagnetic clutch 16 is kept on, so that the throttle valve 15 held by the DC motor 17 that is stopped is kept around the target idle opening. With this, the engine rotation speed is suppressed from increasing during the determination delay time, as well as the idle rotation is assured. Thereafter, when this temporary abnormal state is continued for the determination delay time, the throttle sensor unit is determined to be finally abnormal. Thus, the electromagnetic clutch 16 is turned off and the throttle control of the DC motor 17 is stopped. Hereafter, the throttle valve 15 is opened up to the opener stopper opening by the pulling force of the limp-home running spring 39, so that the idle rotation is assured for limp-home running.

Figure 16:
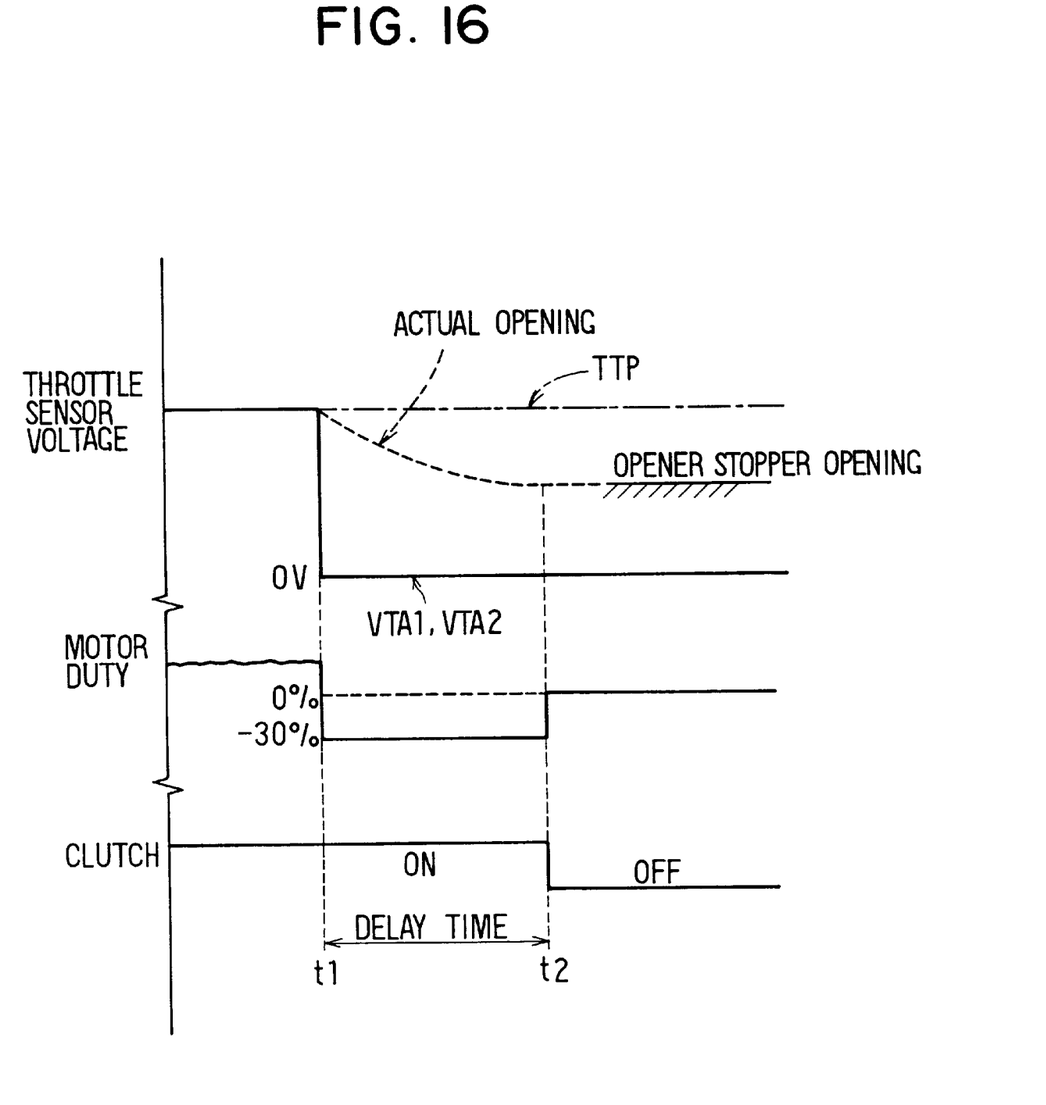
FIG. 16 is a time chart showing operation of the throttle control after a temporary failure is detected when the accelerator is depressed in the electronic throttle control system shown in FIG. 1.

Furthermore, in this embodiment, if the output voltages VTA1 and VTA2 of the throttle sensors S1 and S2 become 0V due to a wire break when the accelerator is turned on and a temporary failure is detected at time t1, then the motor duty is fixed to the minimum value (eg., −30%) for closing the throttle valve 15 (in steps 311 and 313 shown in FIG. 13). With this, the throttle valve 15 is closed gradually. Thereafter, if this temporary failure state is continued for the preset determination delay time (t1–t2), the failure is determined to be a real one. The electromagnetic clutch 16 is thus turned off and the throttle control of the DC motor 17 is stopped. Then, the throttle valve 15 is held at the opener stopper opening by the pulling force of the limp-home running spring 39, so that the idle rotation of the engine is assured for limp-home running.

According to this embodiment, since a determination delay time is set before a detected temporary failure is finally determined to be a real one, false sensor failure detection which might be caused by noise, wire break, etc. can be prevented, improving the detection accuracy of sensor failure. Furthermore, during the determination delay time after the failure is detected, the motor duty is set to the specified value according to the accelerator state (ON/OFF). Thus, false feedback control caused by the erroneous output from the throttle sensor unit 18 can be prevented, as well as the engine rotation speed can be prevented from increasing during the determination delay time. In addition, the fail-safe operation of the engine can be assured, improving the reliability of the electronic throttle system.

Furthermore, since the feedback control based on the output from the throttle sensor unit 18 is stopped and the feedback variable is initialized when the motor duty is set to a specified value after the temporary failure is detected in this embodiment, it can be prevented to restart the feedback control with the abnormal feedback variable when the output of the throttle valve 15 is restored from the temporary abnormal state caused by noise, instantaneous break, etc. Thus, the normal feedback control can be restored rapidly.

Furthermore, since two throttle sensors S1 and S2 are used to detect the throttle opening and if, even when the temporary failure is detected, either of those two throttle sensors is normal, then the feedback control is performed according to the output from the normal throttle sensor during the preset determination delay time in this embodiment, the throttle controllability during the determination delay time can be improved significantly.

Three or more throttle sensors may be provided. Of course, only one throttle sensor will do.

The sensor failure detecting process is not limited only to the process shown in FIG. 11. For example, sensor failure may be determined by comparing the change rates of two or more throttle sensors, each of which has an output characteristic different from each other or by comparing the output value of the throttle sensor with an abnormal criterion.

The present invention should not be limited to the disclosed embodiment and its modifications but may be altered further without departing from the spirit of the invention.

What is claimed is:

1. An electronic throttle control system for an internal combustion engine having a throttle valve, an accelerator, throttle sensor means for detecting a throttle opening of the throttle valve, control means for feedback controlling the throttle opening electronically by calculating an electronic control quantity for matching the throttle opening with a target throttle opening set according to a depression of the accelerator, and driving means for driving the throttle valve in response to the calculated control quantity, the control system comprising:

failure detecting means for detecting a sensor failure of the throttle sensor means;

temporary failure control means for setting the control quantity to a fixed specified value when the failure detecting means detects the sensor failure indicative of disability of the throttle opening, the specified value being used by the driving means to drive the throttle valve; and control stopping means for stopping an electronic throttle control of the control means when the failure detecting means keeps detecting the sensor failure for a specified determination delay time.

2. The control system of claim 1, wherein:
the temporary failure control means sets the specified value according to the accelerator depression.

3. The control system of claim 1, wherein:
the temporary failure control means includes initializing means for initializing a feedback variable used in calculating the feedback control quantity thereby to stop the feedback control.

4. The control system of claim 1, wherein:
the throttle sensor means includes a plurality of throttle sensors;
the temporary failure control means, when the failure detecting means detects a failure in any throttle sensors, executes the feedback control according to an output from a normal throttle sensor, and sets the control quantity to the specified value when it cannot be determined whether there is a normal throttle sensor; and
the control stopping means stops the throttle control performed by the control means when the failure detecting means keeps detection of the failure in any throttle sensors for the specified determination delay time.

5. An electronic throttle control method for an internal combustion engine having a throttle valve, an accelerator, throttle sensor means for detecting a throttle opening of the throttle valve, and driving means including a motor and a clutch for electrically driving the throttle valve in accordance with a depression of the accelerator, the control method comprising the steps of:

detecting a sensor failure of the throttle sensor means, the sensor failure indicating disability of detecting the throttle opening;

controlling the driving means by a specified control quantity different from changes in the accelerator depression when the sensor failure is detected; and stopping an electronic throttle control of the driving means after the sensor failure continues for a specified determination delay time.

6. The control method of claim 5, wherein:
the controlling step sets the specified control quantity according to the accelerator depression existing at the time of detection of the sensor failure and drives the motor by the specified control quantity during the specified determination delay time.

7. The control method of claim 6, wherein:
the stopping step turns off the clutch after the specified determination delay time.

8. The control system of claim 5, wherein the step of controlling controls the driving means by a specified control quantity different from changes in an output of the throttle sensor means.

9. The control system of claim 1, wherein:
the temporary failure control means sets the specified value to a value unchanged by changes in the accelerator depression.

10. The control system of claim 9, wherein:
the temporary failure control means changes the specified value from one to another in dependence on whether the accelerator depression is above or below a predetermined reference.

11. The control system of claim 1, wherein:
the temporary failure control means sets the specified value to a first value in a direction to close the throttle valve when the accelerator depression is above a predetermined reference, and to a second value to maintain the throttle opening when the accelerator depression is below the predetermined reference.

12. The control system of claim 6, wherein:

the temporary failure control means sets the specified control quality to a first value in a direction to close the throttle valve when the accelerator depression is above a predetermined reference, and to a second value to maintain the throttle opening when the accelerator depression is below the predetermined reference.

13. An electronic throttle control system comprising:

a detector operatively connectable to a sensor of an engine throttle to detect failure of the sensor;

temporary failure control means for generating a signal to drive the throttle independently of the sensor; and control stopping means for stopping electronic control of the throttle when the detector continuously detects failure of the sensor for a given period of time.

14. The system of claim 13, wherein:

the sensor includes multiple sensor elements; and the detector detects the sensor failure only when multiple ones of the sensor elements malfunction.

15. The system of claim 13, wherein the temporary failure control means is for driving the throttle based on actuation of an accelerator pedal.

16. The system of claim 15, wherein the temporary failure control means is for driving the throttle at a constant level.

17. The system of claim 13, wherein the period of time is fixed.

18. A method of electronic throttle control comprising:

detecting a failure of a sensor of an engine throttle;

driving the throttle independently of the sensor responsive to the sensor failure detection; and terminating electronic control of the throttle when the sensor failure is detected for a period of time.

19. The method of claim 18, wherein driving the throttle includes driving the throttle at a fixed level.

20. The method of claim 19, wherein driving the throttle includes driving the throttle at a fixed level based on actuation of an accelerator pedal.

21. The method of claim 18, wherein the period of time is fixed.

* * * * *